United States Patent [19]

Sugimori et al.

[11] Patent Number: 4,992,510

[45] Date of Patent: Feb. 12, 1991

[54] METHOD FOR PRODUCING RUBBER MODIFIED THERMOPLASTIC RESINS

[75] Inventors: Teruhiko Sugimori, Otake; Noriyuki Tajiri, Toyohashi; Fumio Suzuki, Otake; Hideaki Habara, Otake; Yutaro Fukuda, Otake; Haruki Sato, Otake, all of Japan

[73] Assignee: Mitsubishi Rayon Co., Ltd., Tokyo, Japan

[21] Appl. No.: 394,720

[22] Filed: Aug. 16, 1989

Related U.S. Application Data

[62] Division of Ser. No. 946,058, Dec. 24, 1986, Pat. No. 4,880,877.

[30] Foreign Application Priority Data

Dec. 25, 1985 [JP] Japan .................................. 60-295369
Dec. 26, 1985 [JP] Japan .................................. 60-293952
Jul. 17, 1986 [JP] Japan .................................. 61-166571
Jul. 28, 1986 [JP] Japan .................................. 61-175508

[51] Int. Cl.$^5$ ............................................. C08L 51/04
[52] U.S. Cl. ........................................ 525/84; 525/63; 525/73; 525/85; 525/86
[58] Field of Search ................... 523/332, 335; 525/84, 525/63, 73, 85, 86

[56] References Cited

U.S. PATENT DOCUMENTS 3,415,772 12/1968 Heij et al. .......................... 523/332
3,592,878 7/1971 Kromolicki .......................... 525/86
4,647,622 3/1987 Aoyagi et al. ........................ 525/84

FOREIGN PATENT DOCUMENTS 2917321 11/1980 Fed. Rep. of Germany ........ 525/84
2144434 3/1985 United Kingdom .................. 525/84

*Primary Examiner*—Jacob Ziegler
*Attorney, Agent, or Firm*—Oblon, Spivak, McClelland, Maier & Neustadt

[57] ABSTRACT

Disclosed is method for producing a rubber modified thermoplastic reins which comprises carrying out all or a part of the following setps (I) - (VI):

(I) a step of mixing the following (A), (B), (C) and thermoplastic resin (2):
  (A) a latex of graft rubber polymer (1),
  (B) an organic agent which is capable of dissolving thermoplastic resin (2) and has a solubility in water of 5% by weight or less at a temperature at which (A), (B), (C) and thermoplastic resin (2) are mixed, amount of the organic agent being 10–600% by weight of polymer (4) which is the sum of graft rubber polymer (1) and thermoplastic resin (2) and
  (C) a water soluble agent capable of coagulating latex (A), amount of this agent being 10% by weight or less of graft rubber polymer (1),
(II) a step of separating and removing aqueous phase from a two-phase mixture obtained in the mixing step (I),
(III) a step of mixing the mixture from which the aqueous phase has been removed at step (II) and the whole or a part of thermoplastic resin (3),
(IV) a step of removing a part or the whole of organic agent (B) and remaining water from the mixture obtained at step (III) by a thermal means,
(V) a step of mixing the remainder of thermoplastic resin (3) in case a part of thermoplastic resin (3) has been mixed at step (III), and
(VI) a step of removing the remainder of organic agent (B) in case only a part of organic agent (B) has been removed at step (IV).

7 Claims, No Drawings

METHOD FOR PRODUCING RUBBER MODIFIED THERMOPLASTIC RESINS

This is a division, of application Ser. No. 06/946,058, filed on Dec. 24, 1986 now U.S. Pat. No. 4,880,877.

This invention relates to a method for producing a rubber modified thermoplastic resin which comprises mixing a graft rubber polymer produced by graft polymerization of a vinyl monomer on a rubber and a thermoplastic resin and more particularly it relates to a method for efficiently producing a rubber modified thermoplastic resin superior in dispersibility of graft rubber polymer particles by mixing a coagulated substance of a graft rubber polymer latex and a thermoplastic resin in the presence of a specific organic agent with use of less heat.

Generally, most of the rubber modified thermoplastic resins represented by ABS resins are those obtained by mixing and kneading a polymer obtained by graft polymerization of a vinyl monomer on a rubber latex and a thermoplastic resin. Usually, production of them comprises the steps of emulsion graft polymerization, coagulation, solidifying, dehydration, drying, blending, and melt extrusion. The emulsion graft polymerization step is a step of producing a graft polymer latex by emulsion graft polymerizing an acrylic monomer, vinyl cyanide monomer, vinyl aromatic monomer, etc. on a diene rubber latex, vinyl rubber latex, natural rubber latex, silicone rubber latex and the like. The coagulation and solidifying are steps of adding a coagulant such as polyvalent salts and acids to the graft polymer latex to destroy the emulsion state and coagulate the polymer and solidifying the polymer into rigid powders. The dehydration and drying steps are steps of removing the aqueous phase from the mixture of the powdered polymer and water by a means such as centrifugal dehydration or the like and further drying the powders by a means such as flow drying method to obtain dry powders. The blending step is a step of blending said dry powders with other thermoplastic resins and additives such as stabilizer, lubricant, plasticizer, etc. The melt extrusion step is a step of melting, kneading and extruding the blend materials into strands by screw extruder and pelletizing them.

One of the problems in production and quality of the products brought about in the above method of producing rubber modified thermoplastic resins comprising the above steps is firstly that much heat is required. This is because of the use of a large quantity of hot-air at the drying step. The second problem is that since the graft rubber polymer particles are completely coalesced at the coagulating and solidifying steps, a large amount of power is required for completely dispersing the coalescing graft rubber polymer particles in thermoplastic resin at the melting and kneading procedures after the blending step. In the worst case, it becomes industrially impossible to uniformly disperse the graft rubber polymer particles in the thermoplastic resin.

Some proposals have been made to improve the conventional methods of production of rubber modified thermoplastic resins which have problems leading to reduction of industrial competitiveness and some of them have been industrially practised. One of them has aimed at reduction of heat used at the drying step and utilized a screw extruder generally called a dehydration extruder which has a dehydration function. The proposed methods of this type are roughly classified into those according to which the blend of the graft rubber wet powders after subjected to coagulation, solidification and dehydration and other thermoplastic resins and additives or the graft rubber wet powders alone is fed to said dehydration extruder and those according to which graft rubber polymer latex and coagulant together with other thermoplastic resins and additives, if necessary, are fed to said dehydration extruder.

According to these methods the reduction of the heat used can be expected because the drying step at which a large quantity of hot air is used is omitted, but the procedure of dispersing homogeneously the graft rubber polymer particles in the thermoplastic resin is at the same level as that of the conventional techniques. That is, according to the former methods as classified, graft rubber polymer particles in completely coalescing state are treated and thus these methods are the same as the conventional ones from the point of dispersion of particles. According to the latter methods, latex and coagulant are firstly mixed in a treating apparatus and then subjected to dehydration at about 100° C. or lower and at this time the graft rubber polymer particles are ordinarily in the coalescing state. Thereafter, with elevation of temperature the particles melt with the thermoplastic resin are subjected to the kneading procedure. Thus, these methods are different from the former methods only in the state of the starting materials supplied and are similarly the same as the conventional techniques with respect to the dispersion of particles.

There have been further proposed the method where a latex of graft rubber polymer, a coagulant and a monomer are mixed to form a two-phase mixture consisting of an organic phase and an aqueous phase, then the aqueous phase is removed and the monomer contained in the organic phase is polymerized and another method where the monomer is polymerized without removing the aqueous phase from the two-phase mixture, then the aqueous phase is removed and the polymer is dried. These methods are free from the state where the graft rubber polymer particles completely coalesce with each other and hence are distinguishable from the above method using the dehydration extruder on the dispersion of particles. However, in the former method it is necessary to polymerize the high viscous mixture of graft polymer and monomer without bringing about run-away reaction and thus this method has difficulties in apparatus and operation and is not necessarily superior method. Besides, content of rubber component in rubber modified thermoplastic resins has a great effect on the basic properties of resins and for this reason it is impossible to employ the technique by which polymerization is accomplished at a low conversion of high fluctuation of the conversion as in the usual bulk polymerization and the remaining monomer is removed by devolatizing and the reaction must be proceeded until a high conversion where the fluctuation of the conversion is low is attained. Therefore, the reactants become highly viscous and temperature becomes high as compared with even the general bulk polymerization process and so handling of them becomes very difficult. On the other hand, according to the latter method, the monomer is polymerized by suspension polymerization and viscosity of the reactants is low and heat of reaction can be easily removed, but dehydration and drying steps are required and this method is also not an excellent method like the former method.

As mentioned hereinabove, many proposals have been made for the production of rubber modified thermoplastic resins. However, at present, there have not yet been provided the methods according to which both the homogeneous dispersion of graft rubber polymer particles which is essential for development of the basic properties of the resins and the reduction of heat required are simultaneously attained and the desired resins of high quality and high competitiveness can be obtained.

Under the circumstances, in an attempt to solve the problems in the conventional methods, the inventors have proposed the methods for production of rubber modified thermoplastic resins which make it possible to attain homogeneous dispersion of graft rubber polymer particles in thermoplastic resin and which further make it possible to save energy (cf. Japanese Patent Application Ser. Nos. 109102/85 and 295369/85 and USSN No. 864868 filed May 20, 1986). As a result of the inventors' further research, they have found a method which makes it possible to reduce amount of the organic agent and quantity of heat required for removal of the organic agent and to improve productivity of apparatuses used and quality of products with maintaining the advantages of the above methods.

That is, this invention is characterized by carrying out all or a part of the following steps in production of a rubber modified thermoplastic resin comprising a graft rubber polymer (1) produced by emulsion graft polymerization of a vinyl monomer on a rubber latex, a thermoplastic resin (2) and a thermoplastic resin (3):

(I) a step of mixing the following (A), (B), (C) and thermoplastic resin (2):
  (A) a latex of graft rubber polymer (1),
  (B) an organic agent which is capable of dissolving thermoplastic resin (2) and has a solubility in water of 5% by weight or less at a temperature at which (A), (B), (C) and thermoplastic resin (2) are mixed, amount of the organic agent being 10–600% by weight of polymer (4) which is the sum of graft rubber polymer (1) and thermoplastic resin (2) and
  (C) a water soluble agent capable of coagulating latex (A), amount of this agent being 10% by weight or less of graft rubber polymer (1),
(II) a step of separating and removing aqueous phase from a two-phase mixture obtained in the mixing step (I),
(III) a step of mixing the mixture from which the aqueous phase has been removed at step (II) with the whole or a part of thermoplastic resin (3),
(IV) a step of removing a part or the whole of organic agent (B) and remaining water from the mixture obtained at step (III) by a thermal means,
(V) a step of mixing the remainder of thermoplastic resin (3) in case a part of thermoplastic resin (3) has been mixed at step (III), and
(VI) a step of removing the remainder of organic agent (B) in case only a part of organic agent (B) has been removed at step (IV).

The rubber latex used in this invention includes all of those which have been used as the raw materials for rubber modified thermoplastic resins. As examples thereof, mention may be made of latices of diene rubbers such as polybutadiene, polyisoprene, SBR, etc., those of olefin rubbers such as ethylene-propylene rubber, ethylene-vinyl acetate rubber, etc., those of acrylic rubbers such as polyethyl methacrylate, polyethyl acrylate, polybutyl methacrylate, polybutyl acrylate, etc., those of silicone rubbers such as polydimethylsiloxane, etc. These rubber latices may be used singly or in combination of two or more. It is needless to say that in this invention the kind of rubbers has no limitation and in addition to those as enumerated above there may be used any latices of polymers having a rubber elasticity at the temperatures at which the rubber modified thermoplastic resins to be produced are used.

It is very difficult to homogeneously disperse the rubber particles contained in the rubber latices as mentioned above in thermoplastic resins by the conventional methods and even if it becomes possible, satisfactory properties cannot be developed due to bad compatibility between rubber and thermoplastic resin. Therefore, graft polymerization is employed as a means to improve the compatibility and to make possible the dispersion of rubber particles thereby to develop excellent properties.

Vinyl monomers are used for this graft polymerization because the polymerization method is emulsion radical polymerization and it is common to choose the optimum vinyl monomer considering the compatibility and adhesion with the thermoplastic resin to be blended. The same thing can also be applied to this invention. Thus, the vinyl monomers used in this invention for graft polymerization on rubbers include those which have been hitherto used, namely, vinyl cyanide monomers such as acrylonitrile, methacrylonitrile, etc., vinyl aromatic monomers such as styrene, α-methyl styrene, etc., methacrylates such as methyl methacrylate, phenyl methacrylate, etc., halogenated vinyl monomers such as methyl chloroacrylate, 2-chloroethyl methacrylate, etc., and other radical polymerizable monomers.

The thermoplastic resins (2) used in this invention include all of those which are soluble in the organic agents mentioned-hereinafter and the typical examples thereof are acrylonitrile-styrene copolymers, acrylonitrile-α-methylstyrene copolymers, acrylonitrile-α-methylstyrene-N-phenylmaleimide copolymers, polystyrenes, polymethyl methacrylate, polyvinyl chloride, polycarbonate, polysulfone, polyethylene terephthalate, polytetramethylene terephthalate and the like.

As thermoplastic resins (3), mention may be made of those which satisfy the same conditions as for the thermoplastic resins (2) and examples thereof are the same as those of thermoplastic resins (2).

Thermoplastic resins (2) and (3) used may be the same or different.

It is preferred to use these thermoplastic resins (2) and (3) in the form of powder, bead, etc.

The organic agents (B) used in this invention are those which have a solubility in water of 5% by weight or less, preferably 2% by weight or less at 25° C., preferably at a temperature (D) at which latex (A) of graft rubber polymer (1) (referred to as "latex (A)" hereinafter), organic agent (B), water soluble agent (C) and thermoplastic resin (2) are mixed, and which can dissolve said thermoplastic resin (2). This organic agent can be used in an amount of 10–600%, preferably 20–200% by weight of all polymers (4) which are the sum of the graft rubber polymer (1) and thermoplastic resin (2).

When the solubility of the organic agent (B) in water at 25° C. is more than 5% by weight, the aqueous phase of the two phases separated in the mixture becomes cloudy.

When amount of the organic agent (B) is less than 10% by weight of all the polymers (4) which are the sum of the graft rubber polymer (1) contained in latex (A) and thermoplastic resin (2), the effect aimed at in this invention cannot be developed. On the other hand, when the organic agent (B) is used in an amount of more than 600% by weight of all the polymers (4), a large quantity of heat is required for removal of the organic agent. These are not preferred from the industrial viewpoint.

As examples of the organic agents (B) used in this invention, mention may be made of non-polymerizable organic agents such as petroleum ether, benzene, toluene, xylene, ethylbenzene, diethylbenzene, p-cymene, tetralin, methylene chloride, chloroform, carbon tetrachloride, trichlene, chlorobenzene, epichlorohydrin, methyl-n-propyl ketone, acetophenone, n-propyl acetate, n-butyl acetate, 1-nitropropane, etc. and polymerizable organic agents such as styrene, methyl methacrylate, α-methylstyrene, etc. These are mere examples and this invention is never limited to these examples and any organic agents which satisfy the above conditions may be used singly or in combination of two or more.

The water soluble agents (C) having coagulating ability used in this invention include any materials which are water soluble and have an ability to coagulate the latex (A) of graft rubber polymer used and may be used in an amount of 10% by weight or less, preferably 5% by weight or less, more preferably 3% by weight or less of said graft rubber polymer (1) for not causing deterioration of quality of resins to be produced. Generally, the water soluble agent (C) is used in an amount of at least 0.2% by weight. As examples of the water soluble agents (C), mention may be made of salts of polyvalent metals such as aluminum sulfate, aluminum chloride, aluminum nitrate, magnesium sulfate, calcium chloride, calcium nitrate, etc., inorganic acids such as sulfuric acid, hydrochloric acid, nitric acid, etc. and organic acids such as acetic acid, propionic acid, etc.

When latex (A), organic agent (B), water soluble agent (C) and, if necessary, thermoplastic resin (2) are mixed at step (I), the resulting mixture separates into an organic phase comprising graft rubber polymer (1), thermoplastic resin (2) (if mixed), organic agent (B) and a slight amount of a polymerization assistant soluble in said organic agent and an aqueous phase comprising the water soluble agent, water and a slight amount of water soluble polymerization assistant.

There is no special limitation in the order of mixing of latex (A), organic agent (B), water soluble agent (C) and thermoplastic resin (2) (if mixed) at step (I), but preferably they are mixed in the order of latex (A), water soluble agent (C), thermoplastic resin (2) (if mixed) and organic agent (B) or latex (A) and water soluble agent (C) are mixed and then the resulting mixture is mixed with organic agent (B) alone or a mixture of the organic agent (B) and thermoplastic resin (2).

The method of this invention has a great characteristic in mixing thermoplastic resin dividedly as thermoplastic resin (2) and thermoplastic resin (3).

By being mixed with graft rubber polymer (1) at step (I) or after completion of step (II) in the presence of a specific amount of an organic agent, thermoplastic resin (2) has the functions to homogeneously disperse graft rubber polymer particles in graft rubber polymer (1) in thermoplastic resin (2) to prevent reflocculation of the graft rubber polymer particles to cause insufficient dispersion at the subsequent steps. In order to develop such functions of "homogeneous dispersion" and "prevention of reflocculation", there are two important points that amount of thermoplastic resin (2) is more than a specific amount for the amount of graft rubber polymer (1) (except when graft rubber polymer (1) contains a large amount of free polymers mentioned hereinafter) and that an organic agent in an amount more than a specific amount is present when thermoplastic resin (2) and graft rubber polymer (1) are mixed.

Addition amount of thermoplastic resin (2) varies depending on kind of graft rubber polymer (1) and properties desired for the final rubber modified thermoplastic resin product, but suitably is less than the amount of the rubber modified thermoplastic resin contained in the rubber modified thermoplastic resin products. When total amount of the thermoplastic resin necessary for producing the rubber modified thermoplastic resin product is added as thermoplastic resin (2), a large amount of organic agent is required for homogeneous dispersion of graft rubber polymer particles in thermoplastic resin (2) and the amount of the organic agent to be removed at step (IV) and/or step (VI) increases resulting in increase in heat energy necessary for the removal. There is also an increase in the amount of polymer to be mixed for homogeneous dispersion of graft rubber particles of graft rubber polymer (1) and thus there is the disadvantage that energy for mixing increases to cause reduction of productivity of mixing apparatus. In order to eliminate these disadvantages, according to this invention, the thermoplastic resin necessary for production of rubber modified thermoplastic resin products is dividedly mixed as thermoplastic resin (2) which is soluble in organic agent (B) and thermoplastic resin (3).

Whether the thermoplastic resin (2) is mixed at step (I) or after the removal of aqueous phase from the two-phase mixture at step (II) may be determined depending on the affinity between the graft rubber polymer (1) and the organic agent (B) used. When the affinity between the graft rubber polymer (1) and the organic agent (B) is too great, if thermoplastic resin (2) is added after aqueous phase has been removed from the two-phase mixture at step (II) free of thermoplastic resin (2), it sometimes occurs that dissolving and mixing effects of the organic agent (B) are insufficient and thermoplastic resin (2) is not fully mixed to result in insufficient dispersion of the graft rubber polymer particles in the thermoplastic resin (2). In this case, desirably, the organic agent (B) is added to the mixture before the aqueous phase is removed therefrom and where the graft rubber polymer (1) and the thermoplastic resin (2) coexist.

On the other hand, since the volumetric proportion of the aqueous phase in the two-phase mixture is usually the same as or more than that of the organic phase at step (I), addition of thermoplastic resin (2) after the aqueous phase has been removed from the two-phase mixture has the advantage of increase of volumetric efficiency of apparatuses employed at step (I) because the aqueous phase and the thermoplastic resin (2) do not coexist.

Furthermore, if a large amount of vinyl monomer is used for preparation of graft rubber polymer (1), a single polymer of the vinyl monomer produced without being graft polymerized on rubber (said single polymer will be referred to as "free polymer" hereinafter.) is contained in a large amount in the graft polymer and this free polymer may exhibit the "reflocculation preventing function" instead of thermoplastic resin (2). In this case, therefore, it is possible that no thermoplastic resin (2) is mixed and total amount of thermoplastic resin necessary for production of rubber modified thermoplastic resin product is mixed as thermoplastic resin (3) at step (III) and/or step (V) as explained hereinafter.

At step (II), aqueous phase and organic phase are separated from the two-phase mixture obtained in step (I). For the separation, there may be used the common means such as decantation, centrifugal dehydration, press dehydration, etc.

In case thermoplastic resin (2) is not mixed at step (I), the thermoplastic resin (2) is mixed, after step (II), with the organic phase obtained at step (II).

At step (III), the mixture from which aqueous phase has been removed at step (II) is mixed with thermoplastic resin (3).

All of thermoplastic resin (3) may be mixed at step (III) or a part thereof may be mixed at step (III) and the remainder may be mixed at step (V). Thermoplastic resin (3) mixed at step (III) has the function of reducing coloration of mixture at the next step (IV). That is, at step (IV), usually organic agent (B) in the mixture and the remaining water are devolatilized by heating the mixture and, if necessary, under reduced pressure. Upon removal of organic agent (B) from the mixture, dissolving or plasticizing effect of organic agent (B) disappears and the mixture at this stage shows melt flow behavior as polymer (5) which is a mixture of graft rubber polymer (1), thermoplastic resin (2) and thermoplastic resin (3). Normally, such operation of step (IV) is carried out in an extruder and in order to smoothly carry out the treatment of the mixture in the extruder, temperature of the mixture must be higher than the flow starting temperature of polymer (5). Further, evaporation of organic agent (B) and the remaining water is effected within a relatively short period and supply of heat from outside and heating by shearing heat cannot be so expected. Considering that most of the evaporation latent heat of organic agent (B) and the remaining water must be provided by the sensible heat due to the reduction of temperature of the mixture, the mixture must be heated to a temperature considerably higher than the flow starting temperature of polymer (5).

However, rubber component contained in graft rubber polymer (1), especially diene rubbers such as polybutadiene is deteriorated with heat and colored yellow when subjected to the above-mentioned high temperature. This yellowing phenomenon is especially conspicuous with increase in the amount of rubber component in polymer (5) and is further conspicuous especially when the amount of diene rubber component exceeds 40% by weight. That is, even if products of the same rubber content are to be produced, coloring state of a product prepared by subjecting polymer (5) containing greater amount of rubber component to the treatment of step (IV) and then mixing thermoplastic resin (3) at step (V) is inferior to that of a product prepared by mixing thermoplastic resin (3) at step (III) to reduce the amount of rubber component contained in polymer (5) and subjecting it to the treatment of step (IV). Therefore, from the point of reducing the coloring degree of rubber modified thermoplastic resin product, it is preferred to mix at least a part of thermoplastic resin (3) at step (III).

It is desirable that amount of the organic agent remaining in the rubber modified thermoplastic resin products is as small as possible because if a large amount of the organic agent remains, heat deformation temperature and hardness of the products decrease due to plasticizing effect of the organic agent and furthermore, bubbles of vapor of the organic agent are incorporated in the molded products during molding and there may be a problem of toxicity of the organic agent for food use. Ordinarily, it is necessary to reduce the amount of the remaining organic agent to less than 1% by weight, desirably 0.5% by weight. For this "function for reduction of concentration of the remaining organic agent", it is preferred to mix thermoplastic resin (3) at step (V). The reason is considered to be in devolatilization rate of the organic agent from the mixture of the polymer and the organic agent. That is, in case of high concentration of the organic agent in the mixture, the organic agent can be removed relatively rapidly by raising the temperature of the mixture to higher than the boiling point of the organic agent. However, when concentration of the organic agent in the mixture decreases and reaches about 5-1% by weight or less (which may vary depending on the combination of polymer and organic agent), devolatilization rate of the organic agent is nearly proportionate to the concentration of the organic agent in the mixture and thus sharply decreases to make it difficult to devolatilize the organic agent from the mixture.

Further, as the devolatilization rate of the organic agent is higher from graft rubber polymer than from thermoplastic resin, it is desirable to carry out the devolatilization operation of the organic agent in the area where concentration of the graft rubber polymer in the mixture is high. (The reason is not clear, but this seems because affinity of the graft rubber polymer to the organic agent is smaller than that of the thermoplastic resin.). Therefore, advantageously, the treatment of step (IV) is carried out without mixing thermoplastic resin (3) and concentration of the organic agent in the mixture is reduced to less than 5-1% by weight and thereafter, thermoplastic resin (3) is mixed at step (V) to dilute the organic agent in the mixture.

Therefore, it is most desirable to mix thermoplastic resin (3) dividedly at step (III) and step (V) to harmonize the above mentioned "function for reduction of coloration" and "function for reduction of concentration of remaining organic agent".

Step (IV) is a step of removing a part or the whole of organic agent (B) and the remaining water from the mixture obtained at step (III) (an organic phase mainly composed of graft rubber polymer (1), thermoplastic resin (2) and/or thermoplastic resin (3) and organic agent (B)) by the conventional devolatilizing methods including thermal means. Generally, substantially all of organic agent (B) is removed at this step (IV), but if a part of the organic agent (B) is removed to leave the remainder in the mixture, mixing of the mixture and thermoplastic resin (3) at step (V) can be easily accomplished. That is, generally, melt viscosity of thermoplastic resin containing a graft rubber polymer is greatly different from that of the thermoplastic polymer to be mixed because the graft rubber polymer particles are not fluid. Melt-mixing of two polymers greatly different in melt viscosity requires much power. On the other hand, in the presence of an agent capable of dissolving polymers, the polymers have a property as a solution and so mixing of even such polymers greatly different in melt viscosity is very easy.

Step (V) is a step of mixing the remainder of thermoplastic resin (3) with the mixture from which a part or all of organic agent (B) has been devolatilized at step (IV). In case substantially all of organic agent (B) is removed at step (IV), the mixture obtained at step (IV) and thermoplastic resin (3) are mixed at this step (V) to produce the desired rubber modified thermoplastic resin.

In case only a part of organic agent (B) is removed at step (IV), as mentioned hereinabove, generally, melt viscosity of the rubber modified thermoplastic resin containing graft rubber polymer (1) [a mixture of graft rubber polymer (1) and thermoplastic resins (2) and (3) (there may be the case where thermoplastic resins (2) and (3) are not present)] is greatly different from that of the thermoplastic resin. Organic agent (B) is removed to such extent that the mixture obtained at step (IV) and thermoplastic resin (3) can be easily mixed at this step (V).

Step (VI) is a step of removing substantially all of organic agent (B) from the mixture obtained at step (V) when only a part of organic agent (B) is removed at step (IV) and the desired rubber modified thermoplastic resin is produced.

According to this invention, through all or a part of these steps, there can be produced a rubber modified thermoplastic resin excellent in quality and containing substantially no organic agent (B), namely, content of organic agent (B) being less than 1% by weight, desirably less than 0.5% by weight. Furthermore, this invention may include a devolatilizing step subsequent to step (V) or (VI) to remove volatile components such as remaining monomers contained in thermoplastic resin (3) mixed at step (V).

The reason why the graft rubber polymer particles can be homogeneously dispersed in the thermoplastic resin according to this invention is considered that the graft rubber polymer particles are always in the dispersed or softly agglomerated state through the course of production until a final product without the conventional step at which the graft rubber polymer particles completely adhere to each other. Furthermore, this invention does not require use of dryers which has caused a large quantity of heat loss and makes possible the production by the common devices having devolatizing function such as vented extruders, film type evaporators, etc. Thus, this invention makes a great contribution on production cost to the rubber modified thermoplastic resin industries.

The following examples and reference examples illustrate the method of this invention and effects attained by this invention. The parts in these examples and reference examples are all by weight.

EXAMPLES 1–4

Acrylonitrile and styrene were graft polymerized on polybutadiene latex of 0.36 μm in average particle diameter in accordance with the formulation of Table 1 to obtain a latex of graft rubber polymer.

TABLE 1

| Polybutadiene latex | 114.3 parts |
|---|---|
| (polybutadiene | 40 parts) |
| Acrylonitrile | 15 parts |
| Styrene | 45 parts |
| Sodium laurate | 0.5 part |
| Sodium hydroxide | 0.01 part |
| Rongalite | 0.2 part |
| Ferrous sulfate | 0.002 part |

TABLE 1-continued

| EDTA-di-sodium salt | 0.1 part |
|---|---|
| Tertiary-butyl hydroperoxide | 0.3 part |
| Lauryl mercaptan | 0.3 part |
| Deinonized water | 125 parts |
| Polymerization temperature | 70° C. |
| Polymerization time | 240 minutes |

An acrylonitrile-styrene copolymer as a thermoplastic resin (2) and thermoplastic resin (3) was prepared in accordance with the formulation of Table 2.

TABLE 2

| Acrylonitrile | 25 parts |
|---|---|
| Styrene | 75 parts |
| Azobisisobutyronitrile | 0.3 part |
| Lauryl mercaptan | 0.5 part |
| Polyvinyl alcohol (polymerization degree 900) | 0.07 part |
| Sodium sulfate | 0.3 part |
| Water | 250 parts |
| Polymerization temperature | 75° C. |
| Polymerization time | 240 minutes |

After completion of polymerization, the resultant suspension of acrylonitrile-styrene copolymer was subjected to centrifugal dehydration and dried at 80° C. to obtain a powder of said copolymer.

Then, 300 parts of said latex of graft rubber polymer, said powder of the copolymer in an amount as indicated in column 3 of Table 3, toluene in an amount as indicated in column 2 of Table 3, 1000 parts of a dilute 0.1 wt% aqueous sulfuric acid solution, 0.1% by weight (based on the weight of all the polymers) of Irganox 1076 (trademark for aging resister of Ciba-Geigy Co.) and 0.5% by weight (based on weight of all the polymers) of Armide HT (trademark for molding assistant of Lion Armour Co.) were mixed to obtain a mixture, which separated into an aqueous phase and a high viscous organic phase. The aqueous phase was removed and said powder of the copolymer in an amount as indicated in column 4 of Table 3 was added to the organic phase and mixed, the organic phase became a soft particulate material of about 1 mm to 5 mm in diameter, which was molded into strands by a twin-screw granulating machine. The strands were cut by a pelletizer into pellets. These pellets were mixed with the same amount of said molding assistant. This was fed from the first feed opening to a single-screw extruder of 30 mmφ and L/D=30 having two feed openings and one vent and toluene and remaining water were removed from the vent. Then, said powder of copolymer in an amount as indicated in column 5 of Table 3 was fed from the second feed opening and they were melt-mixed and discharged from a die at the tip of the extruder as strands, which were cut by a pelletizer to obtain pellets. The thus obtained pellets had smooth surface and had no non-homogeneous portions called "fish eyes". These pellets were injection molded to make various test pieces and properties thereof were measured to obtain the results as shown in Table 3. These results show that the rubber modified thermoplastic resins produced in these Examples were superior.

TABLE 3

| | Column 2 Amount of toluene | Column 3 Amount of thermoplastic resin (2) added at step (I) | Column 4 Amount of thermoplastic resin (3) added at step (III) | Column 5 Amount of thermoplastic resin (3) added at step (V) | Column 6 Tensile yield strength ASTM D-638 (at 20° C.) | Column 7 Izod impact strength ASTM D-256 (at 20° C., ¼", notched) |
|---|---|---|---|---|---|---|

TABLE 3-continued

| Column 1 | (part) | (part) | (part) | (part) | (kg/mm$^2$) | (kg cm/cm) |
|---|---|---|---|---|---|---|
| Example 1 | 20 | 20 | 100 | 30 | 481 | 31 |
| Example 2 | 20 | 20 | 130 | 0 | 483 | 32 |
| Example 3 | 25 | 50 | 50 | 50 | 482 | 32 |
| Example 4 | 45 | 50 | 50 | 50 | 480 | 32 |
| Comparative Example 1 | 15 | 0 | 100 | 50 | 471 | 27 |

| Column 1 | Column 8 Same as column 7 (at 0° C., ¼″, notched) (kg cm/cm) | Column 9 Rockwell hardness ASTM D-785 (R scale) | Column 10 Melt flow rate ASTM D-1238 (at 200° C., 5 kg) (g/10 min.) | Column 11 Yellow index ASTM D-1925 | Column 12 Concentration of toluene remaining in product (%) |
|---|---|---|---|---|---|
| Example 1 | 26 | 108 | 2.3 | 21 | 0.62 |
| Example 2 | 26 | 108 | 2.1 | 19 | 0.72 |
| Example 3 | 24 | 108 | 2.1 | 21 | 0.59 |
| Example 4 | 24 | 110 | 2.4 | 22 | 0.61 |
| Comparative Example 1 | 21 | 108 | 2.0 | 27 | 0.42 |

COMPARATIVE EXAMPLE 1

In the same manner as of Example 1, pellets of polymer were produced under the conditions as shown in Table 3. Some fish eyes were seen on the surface of the pellets. Thus obtained pellets were injection molded and the resulting test pieces were subjected to the same tests as in Example 1 to obtain the results as shown in Table 3.

COMPARATIVE EXAMPLE 2

The latex of graft rubber polymer produced in Example 1 was coagulated with sulfuric acid by a conventional method and the obtained polymer wet powder was subjected to washing, dehydration and drying to obtain graft rubber polymer dry powder. This graft rubber polymer, the acrylonitrile-styrene copolymer produced in Example 1 and a slight amount of the additives used in Example 1 were mixed and formed into pellets by a screw extruder. The composition of these pellets was the same as that of the pellets obtained in Example 1, but there were many fish eyes on the surface. Thus, the pellets obtained in this Comparative Example had no value as commercial products. Furthermore, these pellets were injection molded and subjected to the same tests as in Example 1 to obtain the results as shown in Table 4.

TABLE 4

| Item | Results |
|---|---|
| Tensile yield strength | 475 kg/cm$^2$ |
| Izod impact strength | 21 kg cm/cm (at 20° C.) |
| ″ | 16 kg cm/cm (at 0° C.) |
| Rockwell hardness | 109 |
| Melt flow rate | 2.0 g/10 min. |

EXAMPLES 5-8

A latex of graft rubber polymer was prepared using the same agents as in Example 1 in accordance with the formulation of Table 5.

TABLE 5

| | |
|---|---|
| Polybutadiene latex | 228.6 parts |
| (Polybutadiene | 80 parts) |
| Acrylonitrile | 5 parts |
| Styrene | 15 parts |
| Sodium laurate | 0.4 part |
| Sodium hydroxide | 0.01 part |
| Rongalite | 0.15 part |
| Ferrous sulfate | 0.001 part |
| EDTA-di-sodium salt | 0.05 part |
| Tertiary-butyl peroxide | 0.1 part |
| Lauryl mercaptan | 0.1 part |
| Deionized water | 50 parts |
| Polymerization temperature | 70° C. |
| Polymerization time | 280 minutes |

60 parts of thus obtained latex of graft rubber polymer, the acrylonitrile-styrene copolymer used in Example 1 and in the amounts as shown in column 3 of Table 6, ethylbenzene in the amounts as shown in column 2 of Table 6 and 40 parts of a 1 wt% aqueous aluminum sulfate solution were mixed to obtain a mixture, which separated into two phases as in Example 1. After removal of the aqueous phase, using the acrylonitrile-styrene copolymer used in Example 1 in the amounts as shown in columns 4 and 5 of Table 6 was added to the organic phase and mixed, and pellets were produced in the same manner as in Example 1. The pellets had smooth surface and had no fish eyes. These pellets were injection molded to make various test pieces and properties thereof were measured in the same manner as in Example 1 to obtain the results as shown in Table 6. These results show that the rubber modified thermoplastic resins produced in these Examples were superior.

TABLE 6

| Column 1 | Column 2 Amount of ethylbenzene (part) | Column 3 Amount of thermoplastic resin (2) added at step (I) (part) | Column 4 Amount of thermoplastic resin (3) added at step (III) (part) | Column 5 Amount of thermoplastic resin (3) added at step (V) (part) | Column 6 Tensile yield strength ASTM D-638 (kg/mm$^2$) | Column 7 Izod impact strength ASTM D-256 | |
|---|---|---|---|---|---|---|---|
| | | | | | | at 20° C., ¼″ notched (kg cm/cm) | at 0° C., ¼″ notched (kg cm/cm) |
| Example 5 | 8 | 12 | 34 | 34 | 478 | 31 | 27 |

TABLE 6-continued

| | | | | | | | |
|---|---|---|---|---|---|---|---|
| Example 6 | 8 | 12 | 68 | 0 | 476 | 30 | 27 |
| Example 7 | 12 | 20 | 30 | 30 | 477 | 31 | 26 |
| Example 8 | 15 | 30 | 20 | 30 | 478 | 32 | 28 |

| Column 1 | Column 8 Rockwell hardness ASTM D-785 (R scale) | Column 9 Melt flow rate ASTM D-1238 (g/10 min.) | Column 10 Yellow index ASTM D-1925 | Column 11 Concentration of ethylbenzene remaining in product (%) |
|---|---|---|---|---|
| Example 5 | 110 | 2.4 | 18 | 0.43 |
| Example 6 | 109 | 2.5 | 17 | 0.64 |
| Example 7 | 110 | 2.3 | 22 | 0.32 |
| Example 8 | 109 | 2.5 | 21 | 0.31 |

EXAMPLES 9–12

Methyl methacrylate and methyl acrylate were graft polymerized on SBR rubber latex of 0.14 μm in average particle diameter in accordance with the formulation of Table 7 to obtain a latex of graft rubber polymer.

TABLE 7

| | |
|---|---|
| SBR rubber latex | 100 parts |
| (SBR rubber | 50 parts) |
| Methyl methacrylate | 45 parts |
| Methyl acrylate | 5 parts |
| Potassium rosinate | 1 part |
| Rongalite | 0.2 part |
| Ferrous sulfate | 0.003 part |
| EDTA-di-sodium salt | 0.1 part |
| Cumene hydroperoxide | 0.4 part |
| Octylmercaptan | 0.2 part |
| Deionized water | 150 parts |
| Polymerization temperature | 65° C. |
| Polymerization time | 240 minutes |

Polymethyl methacrylate as a thermoplastic resin (2) and a thermoplastic rein (3) was produced in accordance with the formulation of Table 8.

TABLE 8

| | |
|---|---|
| Methyl methacrylate | 100 parts |
| Azobisisobutyronitrile | 0.3 part |
| Lauryl mercaptan | 0.5 part |
| Polyvinyl alcohol (polymerization degree 900) | 0.07 part |
| Sodium sulfate | 0.25 part |
| Water | 200 parts |
| Polymerization temperature | 80° C. |
| Polymerization time | 180 minutes |

After completion of polymerization, the obtained suspension of polymethyl methacrylate was subjected to centrifugal dehydration and dried at 80° C. to obtain a powder of the polymer.

Then, 90 parts of said latex of graft rubber polymer, chloroform in the amounts as indicated in column 2 of Table 9, said polymethyl methacrylate in the amounts as indicated in column 3 of Table 9 and 300 parts of a 0.1 wt% dilute aqueous magnesium sulfate solution were mixed. The mixture separated into an aqueous phase and a high viscous organic phase. Using the same device as in Example 1 and with addition of said polymethyl methacrylate powder in the amounts as shown in columns 4 and 5 of Table 9, the mixture was molded into pellets in the same manner as in Example 1. The surface of thus obtained pellets was smooth and there were no fish eyes. These pellets were injection molded to make various test pieces and properties thereof were measured to obtain the results as shown in Table 9. These results indicate that the rubber modified thermoplastic resins produced in these Examples were superior.

TABLE 9

| Column 1 | Column 2 Amount of chloroform (part) | Column 3 Amount of thermoplastic resin (2) added at step (I) (part) | Column 4 Amount of thermoplastic resin (3) added at step (III) (part) | Column 5 Amount of thermoplastic resin (3) added at step (V) (part) | Column 6 Total light transmission ASTM D-1003 (%) | Column 7 Dynstat impact strength DIN-53454 (Kg cm/cm$^2$) | Column 9 Rockwell hardness ASTM D-785 (M scale) | Column 12 Concentration of chloroform remaining in product pellets (%) |
|---|---|---|---|---|---|---|---|---|
| Example 9 | 7 | 10 | 40 | 20 | 89 | 18 | 79 | 0.57 |
| Example 10 | 7 | 10 | 60 | 0 | 90 | 17 | 78 | 0.74 |
| Example 11 | 14 | 20 | 20 | 30 | 88 | 19 | 79 | 0.56 |
| Example 12 | 18 | 40 | 10 | 20 | 88 | 17 | 79 | 0.59 |

REFERENCE EXAMPLE

The pellets obtained in Example 2 were fed again through the first feed opening of the single-screw extruder of 30 mmφ and L/D=30 used in Example 2 and pellets were produced with drawing a vacuum of 160 Torr abs from the vent hole to try removal of toluen remaining in the pellets. (The second feed opening was closed.) Furthermore, thus obtained pellets were subjected to the said operation. This operation was repeated to examine the process of reduction of the amount of the remaining toluene. The results are shown in Table 10.

TABLE 10

| | |
|---|---|
| Concentration of toluene in the mixture before step (V) of Example 2 (calculated) | 8.00% |
| Concentration of toluene remaining in pellets obtained in Example 2 | 0.72% |
| Concentration of toluene in the pellets subjected to the first re-devolatilization | 0.44% |
| Concentration of toluene in the pellets after subjected to two re-devolatilizations | 0.29% |
| Concentration of toluene in the pellets after subjected to three re-devolatilizations | 0.23% |

EXAMPLE 13

300 parts of the same latex of graft rubber polymer as used in Example 1, 50 parts of the same acrylonitrile-styrene copolymer powder as used in Example 1 [thermoplastic resin (2) at step (I)], 240 parts of toluene, 1000 parts of a 0.1 wt % dilute aqueous sulfuric acid solution, 0.25 part of Irganox 1076 and 1.25 parts of Armide HT were mixed. The resulting mixture separated into an aqueous phase and a high viscous organic phase. The organic phase was passed between two press rollers to remove the remaining aqueous phase, followed by adding said molding assistant in the same amount as above. This was fed from the first feed opening of a vented extruder having the first feed opening, vent hole and the second feed opening and toluene was devolatilized from the vent hole and then 100 parts of said copolymer powder [thermoplastic resin (3) at step (V)] was continuously fed from the second feed opening and melt mixed with the polymer fed from the first feed opening to mold the polymer into pellets. The resulting pellets contained 16.0% by weight of polybutadiene and had smooth surface with no fish eyes. These pellets were injection molded to make various test pieces and properties thereof were measured to obtain the results as shown in Table 11. These results show the superiority of the rubber modified thermoplastic resin produced in this Example.

TABLE 11

| Items | Results |
|---|---|
| Tensile yield strength | 480 Kg/cm$^2$ |
| Izod impact strength | 33 Kg/cm (at 20° C.) |
| | 25 Kg/cm (at 0° C.) |
| Rockwell hardness | 110 |
| Melt flow | 2.2 g/10 min. |

EXAMPLE 14

60 parts of the latex of graft rubber polymer used in Example 5, 20 parts of acrylonitrile-styrene copolymer [thermoplastic resin (2) at step (I)] used in Example 1, 25 parts of ethylbenzene and 40 parts of 1 wt % aluminum sulfate were mixed to obtain a mixture, which separated into the two phases as in Example 13. This was subjected to dehydration and devolatilization in the same manner as in Example 13 and then was melt mixed with 60 parts of said acrylonitrile-styrene copolymer [thermoplastic resin (3) at step (V)] and the mixture was moled into pellets. Thus obtained pellets contained 16.0% by weight of polybutadiene and had smooth surface and had no fish eyes. These pellets were injection molded to make various test pieces. Properties of these test pieces were measured by the same procedures as in Example 1 to obtain the results as shown in Table 12. These results indicate the superiority of the rubber modified thermoplastic resin produced in this Example.

TABLE 12

| Items | Results |
|---|---|
| Tensile yield strength | 470 Kg/cm$^2$ |
| Izod impact strength | 32 Kg cm/cm (at 20° C.) |
| " | 26 Kg cm/cm (at 0° C.) |
| Rockwell hardness | 111 |
| Melt flow rate | 2.4 g/10 min. |

EXAMPLE 15

90 parts of the latex of graft rubber polymer used in Example 9, 20 parts of polymethyl methacrylate powder [thermoplastic resin (2) at step (I)] used in Example 9, 50 parts of chloroform and 300 parts of a 0.1 wt % dilute aqueous magnesium sulfate solution were mixed to obtain a mixture which separated into an aqueous phase and a high viscous organic phase. Removal of the aqueous phase and devolatilization of chloroform were carried out by the same device as used in Example 13 and in the same manner as in Example 13, followed by melt-mixing 50 parts of said polymethyl methacrylate powder [thermoplastic resin (3) at step (V)] and pelletization. Thus obtained pellets contained 14.9% by weight of a rubber polymer and had a smooth surface and had no fish eyes. Then, these pellets were injection molded to make various test pieces and properties of the test pieces were measured in the same manner as in Example 9 to obtain the results as shown in Table 13. These results show the superiority of the rubber modified thermoplastic resin obtained in this Example.

TABLE 13

| Items | Results |
|---|---|
| Total light transmission | 88% |
| Dynstat impact strength | 20 Kg cm/cm$^2$ |
| Rockwell hardness | 76 |

EXAMPLE 16

37.5 parts of the latex of graft rubber polymer obtained in Example 5 and 7 parts of a 1 wt % aqueous sulfuric acid solution were fed from a first feed opening to a twin-screw extruder having a first feed opening, a second feed opening, a dehydrating part, a devolatilizing part and a third feed opening. This mixture converted to creamy state before it reached to the second feed opening and separated into an aqueous phase and a high viscous organic phase when 25 parts of dichloromethane and 12.5 parts of the acrylonitrile-styrene copolymer [thermoplastic resin (2) at step (I)] used in Example 1 were added continuously from the second feed opening. Then, the aqueous phase was discharged from the dehydrating part and dichloromethane was devolatilized from the devolatilizing part and thereafter 75 parts of a polycarbonate resin (Novalex 7022 manufactured by Mitsubishi Chemical Industries Ltd.) [thermoplastic resin (3) at step (V)] was continuously added from the third feed opening to melt-mix with the graft rubber polymer and the acrylonitrile-styrene copolymer. The resulting mixture was molded into pellets by extruding from a nozzle. The pellets contained 10.0% by weight of polybutadiene and had no fish eyes. The pellets were injection molded to make standard test pieces and the test results on these test pieces are shown in Table 14 (Measurements were conducted in the same manner as in Example 1).

TABLE 14

| Items | Results |
|---|---|
| Tensile yield strength | 480 Kg/cm$^2$ |
| Izod impact strength | 43 Kg-cm/cm (at 20° C.) |
| Rockwell hardness | 115 |
| Melt flow rate | 0.3 g/10 min. |

EXAMPLE 17

When 300 parts of the latex of graft rubber polymer used in Example 1, 40 parts of the acrylonitrile-styrene copolymer powder [thermoplastic resin (2) at step (I)] used in Example 1, 200 parts of toluene, 1000 parts of a 0.1 wt % dilute aqueous sulfuric acid solution, 0.25 part of Irganox 1076 and 1.25 parts of Armide HT were mixed, the resulting mixture separated into an aqueous phase and a high viscous organic phase. The organic phase was passed between two press rolls to remove remaining aqueous phase and fed from a first feed opening of an extruder having two feed openings for resin and two vent holes and having no special mixing mechanism. A part of toluene contained in the polymer was devolatilized from the first vent hole, 110 parts of said copolymer powder [thermoplastic resin (3) at step (V)] was fed from the second feed opening provided just behind the first vent hole, the remaining toluene was devolatilized from the second vent hole provided down the second feed opening and the polymer was molded into pellets. The proportion of the amounts of toluene devolatilized from the first vent and the second vent was about 3:2. The surface of thus obtained pellets was smooth and there were no fish eyes. These pellets were injection molded to make various test pieces and properties thereof were measured in the same manner as in Example 1 to obtain the results as shown in Table 15. These results show that the rubber modified thermoplastic resin produced in this Example was superior.

TABLE 15

| Items | Results |
|---|---|
| Tensile yield strength | 490 Kg/cm$^2$ |
| Izod impact strength | 31 Kg cm/cm (at 20° C.) |
| " | 27 Kg cm/cm (at 0° C.) |
| Rockwell hardness | 111 |
| Melt flow rate | 2.2 g/10 min. |

EXAMPLE 18

60 parts of latex of graft rubber polymer used in Example 5, 30 parts of the acrylonitrile-styrene copolymer [thermoplastic resin (2) at step (I)] used in Example 1, 40 parts of ethylbenzene and 40 parts of 1 wt % magnesium sulfate were mixed by a continuous kneader. The resulting mixture separated into two phases as in Example 17. This was continuously fed to an extruder having successively a first feed opening, a dehydration part, a first devolatilizing part, a second feed opening and a second devolatilizing part and was subjected to dehydration and first devolatilization, then 71 parts of the acrylonitrile-styrene copolymer [thermoplastic resin (3) at step (V)] used in Example 1 was fed from the second feed opening, second devolatilization was carried out and the polymer was molded into pellets. The proportion of amount of ethylbenzene devolatilized by the first devolatilization and the second devolatilization was about 1:1. The surface of the obtained pellets was smooth and no fish eyes were seen. These pellets were injection molded to make various test pieces and properties thereof were measured to obtain the results as shown in Table 16. These results indicate the superiority of the rubber modified thermoplastic resin produced in this Example.

TABLE 16

| Items | Results |
|---|---|
| Tensile yield strength | 470 Kg/cm$^2$ |
| Izod impact strength | 33 Kg cm/cm (at 20° C.) |
| " | 25 Kg cm/cm (at 0° C.) |
| Rockwell hardness | 111 |
| Melt flow rate | 2.6 g/10 min. |

EXAMPLE 19

When 90 parts of the latex of graft rubber polymer used in Example 9, 10 parts of the polymethyl methacrylate powder [thermoplastic resin (2) at step (I)] used in Example 9, 20 parts of chloroform and 300 parts of a 0.2 wt % dilute aqueous magnesium sulfate solution were continuously mixed, the resulting mixture separated into an aqueous phase and a high viscous organic phase. This mixture was subjected to removal of the aqueous phase and first devolatilization of chloroform by the same device as used in Example 18, successively 60 parts of said polymethyl methacrylate powder [thermoplastic resin (3) at step (V)] was continuously fed from a feed opening provided at the device to carry out melt kneading, then second devolatilization was further carried out and thereafter the polymer mixture was molded into pellets. Thus obtained pellets had smooth surface and had no fish eyes. These pellets were further injection molded to make various test pieces and properties thereof were measured in the same manner as in Example 9 to obtain the results as shown in Table 17. These results show the superiority of the rubber modified thermoplastic resin produced in this Example.

TABLE 17

| Items | Results |
|---|---|
| Total light transmission | 89% |
| Dynstat impact strength | 21 Kg cm/cm$^2$ |
| Rockwell hardness | 75 |

EXAMPLE 20

37.5 parts of the latex of graft rubber polymer obtained in Example 5 and 7 parts of 1 wt % aqueous sulfuric acid solution were continuously fed from a first feed opening of a twin-screw extruder having a first feed opening, a second feed opening, a dehydrating part, a first devolatilizing part, a third feed opening and a second devolatilizing part. This mixture converted to creamy state before reaching the second feed opening and when 10 parts of dichloromethane and 12.5 parts of the acrylonitrile-styrene copolymer [thermoplastic resin (2) at step (I)] used in Example 1 were continuously fed from the second feed opening, the resulting mixture separated into an aqueous phase and a high viscous organic phase. The aqueous phase was discharged from the dehydrating part and a part of dichloromethane was devolatilized from the first devolatilizing part, followed by continuously feeding 75 parts of a polycarbonate resin (Novalex 7022 manufactured by Mitsubishi Chemical Industries Ltd.) [thermoplastic resin (3) at step (V)] from the third feed opening to melt-mix with the mixture of the graft rubber copolymer and the acrylonitrile-styrene copolymer and then devolatilizing the remaining dichloromethane from the second devolatilizing part. The proportion of the amount of dichloromethane devolatilized from the first devolatilizing part and the second devolatilizing part was about 1:4. The mixture thus obtained was molded into pellets by extruding from a nozzle. These pellets contained 10.0% by weight of polybutadiene and had no fish eyes. These pellets were injection molded to make standard test pieces and the test results on these test pieces are shown in Table 18. (Test methods were the same as in Example 1.)

TABLE 18

| Items | Results |
| --- | --- |
| Tensile yield strength | 480 Kg/cm² |
| Izod impact strength | 43 Kg cm/cm (at 20° C.) |
| Rockwell hardness | 115 |
| Melt flow rate | 0.3 g/10 min. |

EXAMPLES 21-25

When 300 parts (100 parts in terms of solid matter) of the latex of graft rubber polymer used in Example 1, toluene in the amounts as indicated in column 2 of Table 19, 1000 parts of a 0.1 wt % dilute aqueous sulfuric acid solution and 0.1% by weight (based on the weight of all the polymers) of an aging resister (Irganox 1076) and 0.5% by weight (based on the weight of all the polymer) of a molding assistant (Armide HT) were mixed at 70° C. for 5 minutes by a 10 l batch type kneader, the resulting mixture separated into an aqueous phase and a high viscous organic phase. When the aqueous phase was removed, followed by adding an acrylonitrile-styrene copolymer used in Example 1 in the amounts as shown in column 3 of Table 19 and mixing and kneading at 70° C. for about 10 minutes, the organic phase became a soft particulate material of about 1 mm-5 mm in diameter and each particle was in such a state that said high viscous material and said copolymer powder were homogeneously mixed. To this particulate material was further added the acrylonitrile-styrene copolymer powder used in Example 1 in the amounts as shown in column 4 of Table 19 and these were mixed for about 2 minutes to obtain a particulate material comprising a dispersion of said copolymer powder in said particulate material. The resulting particulate material was molded into strands by a twin-screw granulating machine, which were cut by a pelletizer into pellets. To these pellets was added said molding assistant in the same amount as above and the mixture was fed from a first feed opening of a single-screw extruder of 30 mmφ and L/D=30 which had two feed openings and one vent and toluene and remaining water were removed from the vent, then the acrylonitrile-styrene copolymer powder used in Example 1 in the amounts as shown in column 5 of Table 19 was fed from the second feed opening to carry out melt-mixing and the mixture was discharged from the die at the tip of the extruder as strands. The resulting strands were cut by a pelletizer to obtain the objective pellets. Thus obtained pellets had a smooth surface and there were no fish eyes. They were injection molded to make various test pieces and properties thereof were measured in the same manner as in Example 1 to obtain the results as shown in Table 19. These results indicate that the rubber modified thermoplastic resin obtained in this Example was superior.

TABLE 19

| Column 1 | Column 2 Amount of toluene (part) | Column 3 Amount of thermoplastic resin (2) (part) | Column 4 Amount of thermoplastic resin (3) added at step (III) (part) | Column 5 Amount of thermoplastic resin (3) added at step (V) (part) | Column 6 Tensile yield strength (kg/mm²) | Column 7 Izod impact strength (at 20° C.) (kg cm/cm) |
| --- | --- | --- | --- | --- | --- | --- |
| Example 21 | 20 | 20 | 100 | 30 | 480 | 32 |
| Example 22 | 20 | 20 | 0 | 130 | 477 | 30 |
| Example 23 | 20 | 20 | 130 | 0 | 482 | 33 |
| Example 24 | 25 | 50 | 50 | 50 | 483 | 31 |
| Example 25 | 45 | 50 | 50 | 50 | 482 | 33 |

| Column 1 | Column 8 Izod impact strength (at 0° C.) (kg cm/cm) | Column 9 Rockwell hardness | Column 10 Melt flow rate (g/10 min.) | Column 11 Yellow index | Column 12 Concentration of toluene remaining in product (%) |
| --- | --- | --- | --- | --- | --- |
| Example 21 | 26 | 109 | 2.2 | 20 | 0.60 |
| Example 22 | 24 | 110 | 2.1 | 29 | 0.23 |
| Example 23 | 26 | 107 | 2.3 | 18 | 0.71 |
| Example 24 | 27 | 108 | 2.1 | 22 | 0.56 |
| Example 25 | 25 | 109 | 2.3 | 23 | 0.59 |

EXAMPLES 26-30

When 60 parts (20 parts in terms of solid matter) of the latex of graft rubber polymer used in Example 5, ethylbenzene in the amounts as shown in column 2 of Table 20 and 40 parts of 1% aqueous aluminum sulfate solution were mixed, the resulting mixture separated into two phases as in Example 21. The aqueous phase was removed and the remainder was treated in the same manner as in Example 21 using the acrylonitrile-styrene copolymer used in Example 1 in the amounts as shown in columns 3, 4 and 5 of Table 20 and molded into pellets. The surface of the pellets was smooth and they had no fish eyes. These pellets were injection molded to make various test pieces and properties thereof were measured in the same manner as in Example 1 to obtain the results as shown in Table 20. These results show the superiority of the rubber modified thermoplastic resin produced in these Examples.

TABLE 20

| | Column 2 | Column 3 | Column 4 Amount of thermoplastic | Column 5 Amount of thermoplastic | Column 6 | Column 7 Izod impact |

TABLE 20-continued

| Column 1 | Amount of ethyl-benzene (part) | Amount of thermoplastic resin (2) (part) | resin (3) added at step (III) (part) | resin (3) added at step (V) (part) | Tensile yield strength (kg/mm²) | strength ASTM D-256 at 20° C. (kg cm/cm) | at 0° C. (kg cm/cm) |
|---|---|---|---|---|---|---|---|
| Example 26 | 8 | 12 | 34 | 34 | 476 | 32 | 28 |
| Example 27 | 8 | 12 | 0 | 68 | 478 | 32 | 27 |
| Example 28 | 8 | 12 | 68 | 0 | 474 | 31 | 26 |
| Example 29 | 12 | 20 | 30 | 30 | 475 | 32 | 28 |
| Example 30 | 15 | 30 | 20 | 30 | 477 | 31 | 27 |

| Column 1 | Column 8 Rockwell hardness (R scale) | Column 9 Melt flow rate (g/10 min.) | Column 10 Yellow index | Column 11 Concentration of ethylbenzene remaining in product (%) |
|---|---|---|---|---|
| Example 26 | 109 | 2.5 | 19 | 0.40 |
| Example 27 | 110 | 2.3 | 31 | 0.18 |
| Example 28 | 108 | 2.6 | 16 | 0.61 |
| Example 29 | 109 | 2.4 | 21 | 0.28 |
| Example 30 | 110 | 2.4 | 20 | 0.30 |

EXAMPLES 31–35

90 parts (30 parts in terms of solid matter) of the latex of graft rubber polymer used in Example 9, chloroform in the amounts as shown in column 2 of Table 21 and 300 parts of 0.1 wt % aqueous magnesium sulfate solution were mixed to obtain a mixture which separated into an aqueous phase and a high viscous organic phase. The mixture was treated by the device used in Example 21 in the same manner as in Example 21 with addition of the polymethyl methacrylate powder used in Example 9 in the amounts as shown in columns 3, 4 and 5 of Table 21 and the mixture obtained was molded into pellets. These pellets had a smooth surface and no fish eyes were found. These pellets were injection molded to make test pieces and properties thereof were measured in the same manner as in Example 9 to obtain the results as shown in Table 21. These results means that the rubber modified thermoplastic resins were superior.

EXAMPLES 36 and 37

A latex of graft rubber polymer was prepared with the formulation of Table 22 using the same agents as in Example 1.

TABLE 22

| | |
|---|---|
| Polybutaidene latex (30 parts in terms of polybutadiene solid content) | 85.7 parts |
| Acrylonitrile | 17.5 parts |
| Styrene | 52.5 parts |

TABLE 22-continued

| | |
|---|---|
| Sodium laurate | 0.6 part |
| Sodium hydroxide | 0.01 part |
| Rongalit | 0.3 part |
| Ferrous sulfate | 0.002 part |
| EDTA-di-sodium salt | 0.12 part |
| tert-Butylhydroperoxide | 0.35 part |
| Lauryl mercaptan | 0.35 part |
| Deionized water | 143 parts |
| Polymerization temperature | 70° C. |
| Polymerization time | 240 minutes |

Grafting rate on the polybutadiene in thus obtained latex of graft rubber polymer was 40% and the graft rubber polymer contained 58 parts of single polymer.

When 160 parts (53 parts in terms of solid content) of this latex of graft rubber polymer, toluene in the amounts as shown in column 2 of Table 23, 1000 parts of 0.1 wt % dilute sulfuric acid and the same aging resister and the same molding assistant in the same amounts as those used in Example 21 were mixed, the resulting mixture separated into two phases as in Example 21 and was treated in the same manner as in Example 21 using the same acrylonitrile-styrene copolymer as in Example 1 in the amounts as shown in columns 3, 4 and 5 of Table 23 to obtain pellets.

Thus obtained pellets were smooth in surface and had no fish eyes. These pellets were injection molded to make test pieces and properties thereof were measured in the same manner as in Example 1 to obtain the results as shown in Table 23.

TABLE 21

| Column 1 | Column 2 Amount of chloroform (part) | Column 3 Amount of thermoplastic resin (2) (part) | Column 4 Amount of thermoplastic resin (3) added at step (III) (part) | Column 5 Amount of thermoplastic resin (3) added at step (V) (part) | Column 6 Total light transmission (%) | Column 7 Dynstat impact strength (Kg cm/cm²) | Column 9 Rockwell hardness (M scale) | Column 12 Concentration of chloroform remaining in product pellets (%) |
|---|---|---|---|---|---|---|---|---|
| Example 31 | 7 | 10 | 40 | 20 | 88 | 17 | 80 | 0.55 |
| Example 32 | 7 | 10 | 0 | 60 | 86 | 16 | 81 | 0.26 |
| Example 33 | 7 | 10 | 60 | 0 | 89 | 16 | 79 | 0.72 |
| Example 34 | 14 | 20 | 20 | 30 | 88 | 18 | 79 | 0.53 |
| Example 35 | 18 | 40 | 10 | 20 | 87 | 17 | 80 | 0.59 |

TABLE 23

Column 4    Column 5

TABLE 23-continued

| Column 1 | Column 2 Amount of toluene (part) | Column 3 Amount of thermoplastic resin (2) (part) | Amount of thermoplastic resin (3) added at step (III) (part) | Amount of thermoplastic resin (3) added at step (V) (part) | Column 6 Tensile yield strength (kg/mm²) | Column 7 Izod impact strength ASTM D-256 at 20° C. (kg cm/cm) | at 0° C. (kg cm/cm) |
|---|---|---|---|---|---|---|---|
| Example 36 | 18 | 20 | 0 | 27 | 477 | 30 | 26 |
| Example 37 | 9 | 0 | 47 | 0 | 479 | 31 | 25 |

| Column 1 | Column 8 Rockwell hardness (R scale) | Column 9 Melt flow rate (g/10 min.) | Column 10 Yellow index | Column 11 Concentration of toluene remaining in product (%) |
|---|---|---|---|---|
| Example 36 | 110 | 2.2 | 23 | 0.41 |
| Example 37 | 109 | 2.3 | 20 | 0.65 |

The advantage of the process of this invention in comparison with conventional processes is that the polymers need not be powdered. Further advantages are as follows:

(1) Dehydration and drying after production of wet powder by coagulation of latex and air transportation and storage of powder can be omitted. Thus, simplification of process is possible.

(2) Heat loss in dryer can be avoided. Cost can be reduced.

(3) Dust is not formed and working atmosphere is not polluted.

(4) According to this invention, a graft rubber polymer is dispersed in a thermoplastic resin in the presence of an organic agent and so the particles of graft rubber polymer do not coalesce with each other and homogeneous dispersion of the particles becomes possible. Thus, it is possible to produce rubber modified thermoplastic resin superior in quality to those produced by conventional processes.

(5) It is possible to produce rubber modified thermoplastic resin free from fish eyes, etc. which causes poor appearance of the products.

Furthermore, according to this invention, time of addition of the thermoplastic resin and effect of use of the thermoplastic resin are analyzed in detail to result in the following effects.

(6) Amount of the organic agent used can be reduced.

(7) Volumetric efficiency of the device can be improved.

That is, this invention provides the technique for producing rubber modified thermoplastic resins of high quality at low cost.

What is claimed is:

1. A method for producing a rubber modified thermoplastic resin comprising graft rubber polymer (1) produced by emulsion graft polymerization of a vinyl monomer on a rubber latex, thermoplastic resin (2) and thermoplastic resin (3) which comprises carrying out successively the following steps:

(I) a step of mixing the following (A), (B), (C) and thermoplastic resin (2):

(A) a latex of graft rubber polymer (1), (B) an organic agent which is capable of dissolving thermoplastic resin (2) and has a solubility in water of 5% by weight or less at a temperature at which (A), (B), (C) and thermoplastic resin (2) are mixed, amount of the organic agent being 10–600% by weight of the sum of the graft rubber polymer (1) and thermoplastic resin (2), (C) a water soluble agent capable of coagulating the latex (A), amount of this agent being 10% by weight or less of graft rubber polymer (1).

(II) a step of separating and removing an aqueous phase from a two-phase mixture obtained in the mixing step (I), (III) a step of mixing the mixture from which the aqueous phase has been removed at step (II) with the whole, a part or none of thermoplastic resin (3), (IV) a step of removing, by a thermal means, the whole or a part of the organic agent (B) and remaining water from the mixture obtained at step (III) when thermoplastic resin (3) has been mixed at step (III), or removing the whole or a part of the organic agent (B) and remaining water from the mixture from which the aqueous phase has been removed at step (II) when thermoplastic resin (3) has not been mixed at step (III), (V) a step of mixing the remainder of the thermoplastic resin (3) when a part of the thermoplastic resin (3) has been mixed at step (III) or mixing the whole of the thermoplastic resin (3) when the thermoplastic resin (3) has not been mixed at step (III) and (VI) a step of removing the remainder of the organic agent (B) from the mixture obtained at step (V) when a part of the organic agent (B) has been removed at step (IV).

2. A method for producing rubber modified thermoplastic resin according to claim 1, wherein the organic agent (B) has the solubility in water of 5% by weight or less at 25° C.

3. A method for producing a rubber modified thermoplastic resin comprising graft rubber polymer (1) produced by emulsion graft polymerization of a vinyl monomer on a rubber latex, thermoplastic resin (2) and thermoplastic resin (3) which comprises carrying out successively the following steps:

(I) a step of mixing the following (A), (B), (C):

(A) a latex of graft rubber polymer (1), (B) an organic agent which is capable of dissolving thermoplastic resin (2) added in step (II') and has a solubility in water of 5% by weight or less at a temperature at which (A), (B), (C) and thermoplastic resin (2) are mixed, amount of the organic agent being 10–600% by weight of the sum of the graft rubber polymer (1), and thermoplastic resin (2), (C) a water soluble agent capable of coagulating the latex (A), amount of this agent being 10% by weight or less of graft rubber polymer (1).

(II) a step of separating and removing an aqueous phase from a two-phase mixture obtained in the mixing step (I), (II') a step of mixing thermoplastic resin (2) with the mixture obtained in step (II) from which the aqueous phase has been removed, (III) a step of mixing the mixture obtained in step (II') with the whole or none of thermoplastic resin (3), (IV) a step of removing, by a thermal means, the whole or a part of the organic agent (B) and remaining water from the mixture obtained at step (III) when thermoplastic resin (3) has been mixed at step (III), or removing the whole or a part of the organic agent (B) and remaining water from the mixture from which the aqueous phase has been removed at step (II) when thermoplastic resin (3) has not been mixed at step (III), (V) a step of mixing the whole of the thermoplastic resin (3) when the thermoplastic resin (3) has not been mixed at step (III) and (VI) a step of removing the remainder of the organic agent (B) from the mixture obtained at step (V) when a part of the organic agent (B) has been removed at step (IV).

4. A method for producing a rubber modified thermoplastic resin according to claim 3, wherein all of the thermoplastic resin (3) is mixed at step (V).

5. A method for producing a rubber modified thermoplastic resin comprising graft rubber polymer (1) produced by emulsion graft polymerization of a vinyl monomer on a rubber latex and thermoplastic resin (3) which comprises carrying out successively the following steps:

(I) a step of mixing the following (A), (B), (C):
(A) a latex of graft rubber polymer (1), (B) an organic agent which has a solubility in water of 5% by weight or less at a temperature at which (A), (B) and (C) are mixed, amount of the organic agent being 10–600% by weight of the graft rubber polymer (1), (C) a water soluble agent capable of coagulating the latex (A), amount of this agent being 10% by weight or less of graft rubber polymer (1).

(II) a step of separating and removing an aqueous phase from a two-phase mixture obtained in the mixing step (I), (III) a step of mixing the mixture from which the aqueous phase has been removed at step (II) with the whole, a part or none of thermoplastic resin (3), (IV) a step of removing, by a thermal means, the whole or a part of the organic agent (B) and remaining water from the mixture obtained at step (III) when thermoplastic resin (3) has been mixed at step (III), or removing the whole or a part of the organic agent (B) and remaining water from the mixture from which the aqueous phase has been removed at step (II) when thermoplastic resin (3) has not been mixed at step (III), (V) a step of mixing the remainder of the thermoplastic resin (3) when a part of the thermoplastic resin (3) has been mixed at step (III) or mixing the whole of the thermoplastic resin (3) when the thermoplastic resin (3) has not been mixed at step (III) and (VI) a step of removing the remainder of the organic agent (B) from the mixture obtained at step (V) when a part of the organic agent (B) has been removed at step (IV).

6. A method for producing a rubber modified thermoplastic resin according to claim 3, wherein the organic agent (B) has the solubility in water of 5% by weight or less at 25° C.

7. A method for producing a rubber modified thermoplastic resin according to claim 5, wherein the organic agent (B) has the solubility in water of 5% by weight or less at 25° C.

* * * * *